United States Patent
Denzer et al.

[11] Patent Number: 5,829,652
[45] Date of Patent: Nov. 3, 1998

[54] BODY-CONFORMABLE APPARATUS

[76] Inventors: Joanne Denzer; Thom L. Gambaro, both of 2104 SE 12$^{th}$ St., Suite 306, Portland, Oreg. 97214

[21] Appl. No.: 802,636

[22] Filed: Feb. 19, 1997

[51] Int. Cl.$^6$ ....................................................... A45F 5/00
[52] U.S. Cl. .......................... 224/270; 222/259; 222/908; 396/420; 396/422
[58] Field of Search ................................ 224/270, 271, 224/272, 259, 261, 262, 263, 264, 627, 628, 637, 638, 646, 647, 650, 908, 909; 108/43; 352/243; 396/420, 422, 423

[56] References Cited

U.S. PATENT DOCUMENTS

| D. 106,869 | 11/1937 | Miller | 224/259 |
|---|---|---|---|
| 1,816,262 | 7/1931 | Ritter | 224/259 |
| 2,552,205 | 5/1951 | Moss | 224/272 |
| 2,603,134 | 7/1952 | Burnam | 224/270 |
| 2,620,479 | 12/1952 | Buck | 224/638 |
| 3,106,350 | 10/1963 | Wiltse et al. | 396/423 |
| 3,332,593 | 7/1967 | Fauser | 396/420 |
| 3,661,308 | 5/1972 | Walters | 224/270 |
| 3,767,095 | 10/1973 | Jones | 224/270 |
| 4,298,149 | 11/1981 | Gottschalk et al. | 224/262 |
| 4,526,308 | 7/1985 | Dovey | 224/908 |
| 4,637,536 | 1/1987 | Wong | 224/262 |
| 4,976,387 | 12/1990 | Spianti | 224/262 |
| 5,042,763 | 8/1991 | Wong | 224/908 |
| 5,114,059 | 5/1992 | Thatcher | 224/643 |
| 5,419,475 | 5/1995 | Naritomi | 224/264 |
| 5,435,515 | 7/1995 | Digiulio et al. | 224/908 |
| 5,464,137 | 11/1995 | Shirdavani | 224/272 |
| 5,632,429 | 5/1997 | Cantwell | 224/264 |

FOREIGN PATENT DOCUMENTS

| 41075 | 5/1942 | Germany | 224/270 |
|---|---|---|---|

*Primary Examiner*—Allan N. Shoap
*Assistant Examiner*—Gregory Vidovich
*Attorney, Agent, or Firm*—Kolisch Hartwell Dickinson McCormack & Heuser

[57] ABSTRACT

A body-conformable apparatus that includes a platform that is configured to removably and adjustably receive a photography device and maintain the device in an operative position for use by a user. The platform is removably and adjustably mounted on a flexible, resilient harness that is selectively securable on a user's shoulders and upper torso. The harness includes an annular portion conformable to the contours of a user's shoulders and upper torso and has a pair of laterally spaced shoulder regions, which are joined by a pair of spaced-apart transverse regions to collectively define an enlarged central passage for receiving a user's head when the harness is worn by a user. Each shoulder region includes a plurality of spaced-apart sockets that are each aligned with a corresponding socket on the other shoulder region, and the platform is pivotally and adjustably mounted on a pair of the mounting sockets.

19 Claims, 5 Drawing Sheets

BODY-CONFORMABLE APPARATUS

TECHNICAL FIELD

The present invention relates generally to tripods and other mounting equipment whereby a photography device, such as a camera, is supported in an operative position. More particularly, it concerns a wearable, body-conformable apparatus with a flexible harness that is worn upon a user's shoulders and upper body and curvingly conforms to the user's over-the-shoulder posture. An adjustable platform is mounted on the harness for maintaining a photography device in an operative, ready-to-use position.

BACKGROUND

A wearable camera-mounting device is known that is securable about a user's shoulders and upper body and adjustably receives a camera. The device includes a rigid, generally Y-shaped forward member and a rigid, generally T-shaped rearward member. The top of each member terminates at a pair of laterally spaced tabs that are each joined to a corresponding tab on the other member by a flexible strap which maintains the members in a generally opposed configuration. From a side view, each member has an angular shape, with the upper half of each member extending at a fixed angle from the lower half toward the opposing member, and with the tabs further extending from the upper half at a fixed angle toward the opposing tabs on the other member. A flexible strap with a hook and loop closure mechanism is used to draw the lower ends of the members toward each other, thereby securing the device upon a user's upper torso. The strap is fastened to the lower end of the rearward member and has ends which extend through a pair of laterally spaced slots in the lower end of the forward member and are secured in a desired position by the closure mechanism.

When the device is worn, the members are positioned adjacent a user's chest and back, respectively, with the straps and upper portions of the members adjacent the user's shoulders. Because of the rigid, angular construction of the members, they are not only uncomfortable to wear, but also tend to dig into or pinch the user's body when the device is worn, and especially when the user moves while wearing the device. The straps are flexible, yet provide no resistance to the edges of the plates pinching the user's shoulders. Furthermore, the inflexible, defined shapes of the members are not adjustable to conform to the specific shape of a user's upper torso.

The problems inherent in the device are especially prevalent when it is worn by different-sized users. For example, relatively slim users will be more prone to having their shoulders pinched by the upper ends of the members pivoting toward each other as the user moves. On the other hand, relatively heavy or stout users will be more prone to the device tightly fitting on the user's shoulders, thereby rendering the device uncomfortable and unpleasant to wear. Furthermore, once the device is fastened upon a user, the rigid construction of the members makes it difficult or uncomfortable for the user to twist and bend while the device is worn.

A rigid platform is pivotally mounted at a predefined, fixed elevation on the upper ends of the forward member by a pair of piano hinges. The platform includes lateral members with first ends each connected to a respective one of the hinges. The lateral members extend toward each other and have second ends that are connected by a camera mounting surface, which is disposed downwardly at an angle of approximately 30° relative to the lateral members. The surface includes an elongate slot that extends generally transverse to the lateral members and allows the camera to be mounted on the surface and adjusted left-to-right with respect to a user's eyes. In addition, a rigid generally U-shaped brace is connected to the harness and the underside of the platform to secure the platform in one of three defined orientations with respect to the harness. The brace has a pair of upper portions that are each connected by piano hinges to the underside of a respective one of the platform's lateral members approximately one third of the distance from the platform's first end to the platform's second end. The lower portion of the brace is received within one of three clips on the harness' forward member to secure the platform in a fixed position. By varying the clip into which the lower portion is received, the height of the camera with respect to a user's eyes is adjusted.

The device is limited in utility and application because of the previously-described inability to conform to the shapes and sizes of various users. In addition, the platform on which a camera is mounted is pivotally adjustable upward and downward between one of three selected positions, however, the distance between the mounted camera and the user's eyes remains relatively constant. This is undesirable because cameras come in various depths. For example, video cameras and many styles of photographic cameras are more elongate than standard photographic cameras and therefore could not be used on the previously-described device because there would be insufficient room between the user's eyes and the eye piece of the photography device. In addition, the device does not provide mounting surfaces for other photography devices, such as commercial video units, digital cameras, lighting units, and other electronic equipment used with any of the previously-described photographic devices. Instead, the device's platform provides only a single mounting slot in which only the lateral position of the unit may be adjusted. The lower half of the forward member includes a second elongate slot, however, at least a portion of this slot is obstructed by the platform and brace, thereby limiting the utility of the slot.

Therefore, there is a need for a body-conformable device that is adaptable to the over-the-shoulder postures of a wide variety of users and provides adjustable mounting assemblies for all forms of photography devices, including cameras, video cameras, digital cameras, commercial video cameras and box cameras, in a comfortable, weight-distributing apparatus that may be worn upon a user's shoulders and upper body to transform the user's body into a tripod.

SUMMARY OF THE INVENTION

Briefly, the invented body-conformable apparatus includes a platform that is configured to removably and adjustably receive a photography device and maintain the device in an operative position for use by a user. The platform is removably and adjustably mounted on a flexible, resilient harness that is selectively securable on a user's shoulders and upper torso. The harness includes a one-piece annular portion conformable to the contours of a user's shoulders and upper torso and has a pair of laterally spaced shoulder regions, which are joined by a pair of spaced-apart transverse regions to collectively define an enlarged central passage for receiving a user's head when the harness is worn by a user. Each shoulder region includes a plurality of spaced-apart sockets that are each aligned with a corresponding socket on the other shoulder region, and the platform is pivotally and adjustably mounted on a pair of the mounting sockets.

These and additional objects and advantages of the present invention will be more readily understood after consideration of the drawings and the detailed description of the preferred embodiment which follows.

DETAILED DESCRIPTION OF THE PREFERRED EMBODIMENTS AND BEST MODE OF CARRYING OUT THE INVENTION

Figure 1:
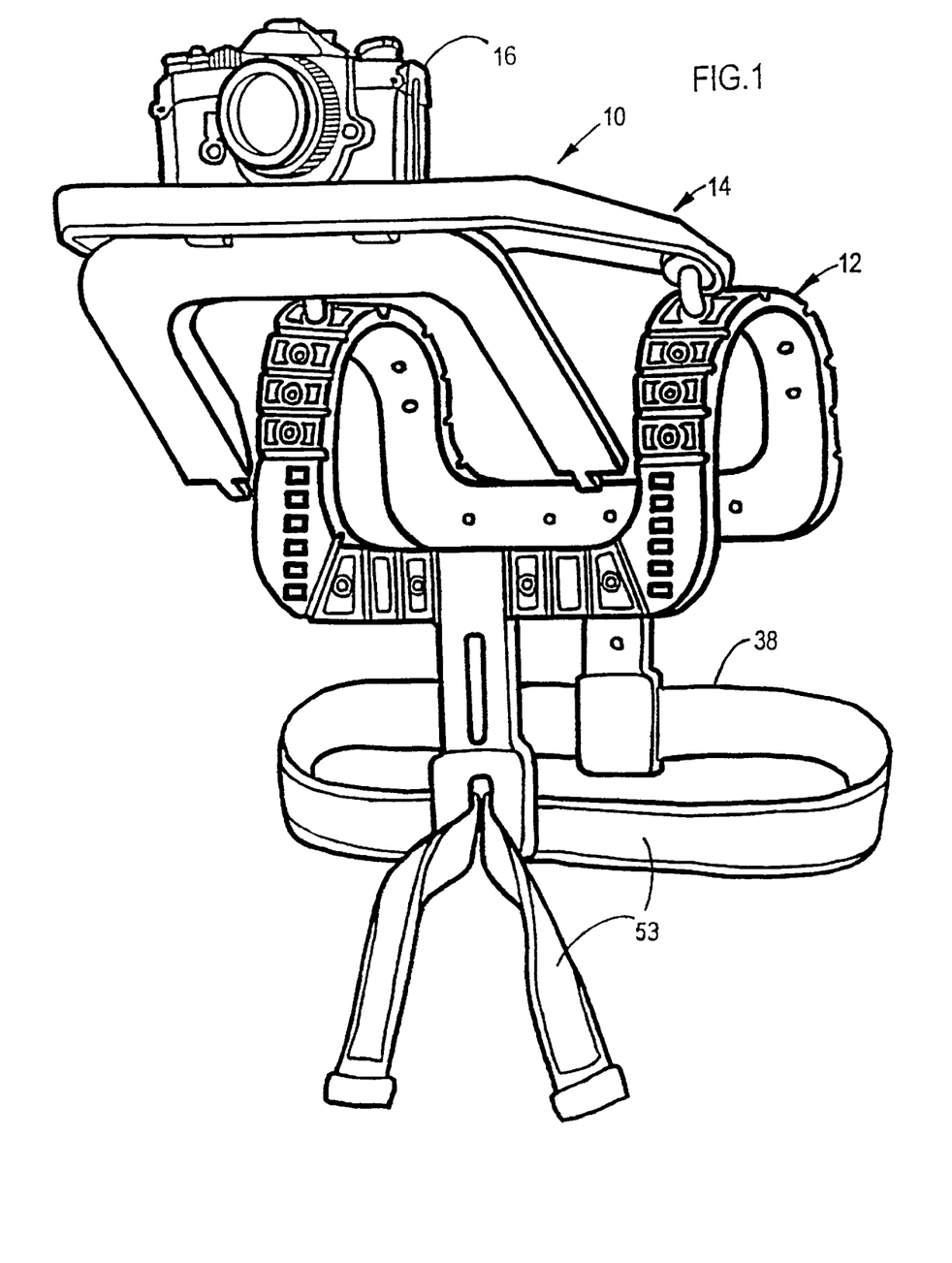
FIG. 1 is an isometric view of the body-conformable apparatus made in accordance with a preferred embodiment of the present invention, with a camera mounted on the apparatus.

A body-conformable apparatus constructed according to the present invention is shown in FIG. 1 and is generally indicated at 10. The apparatus includes a flexible, resilient harness 12, which is securable upon a user's shoulders and upper torso, and a platform 14 for removably receiving a photography device, such as camera 16. The platform is pivotally and adjustably mounted on the harness adjacent the user's shoulders and extends generally forward therefrom.

Figures 2, 3:
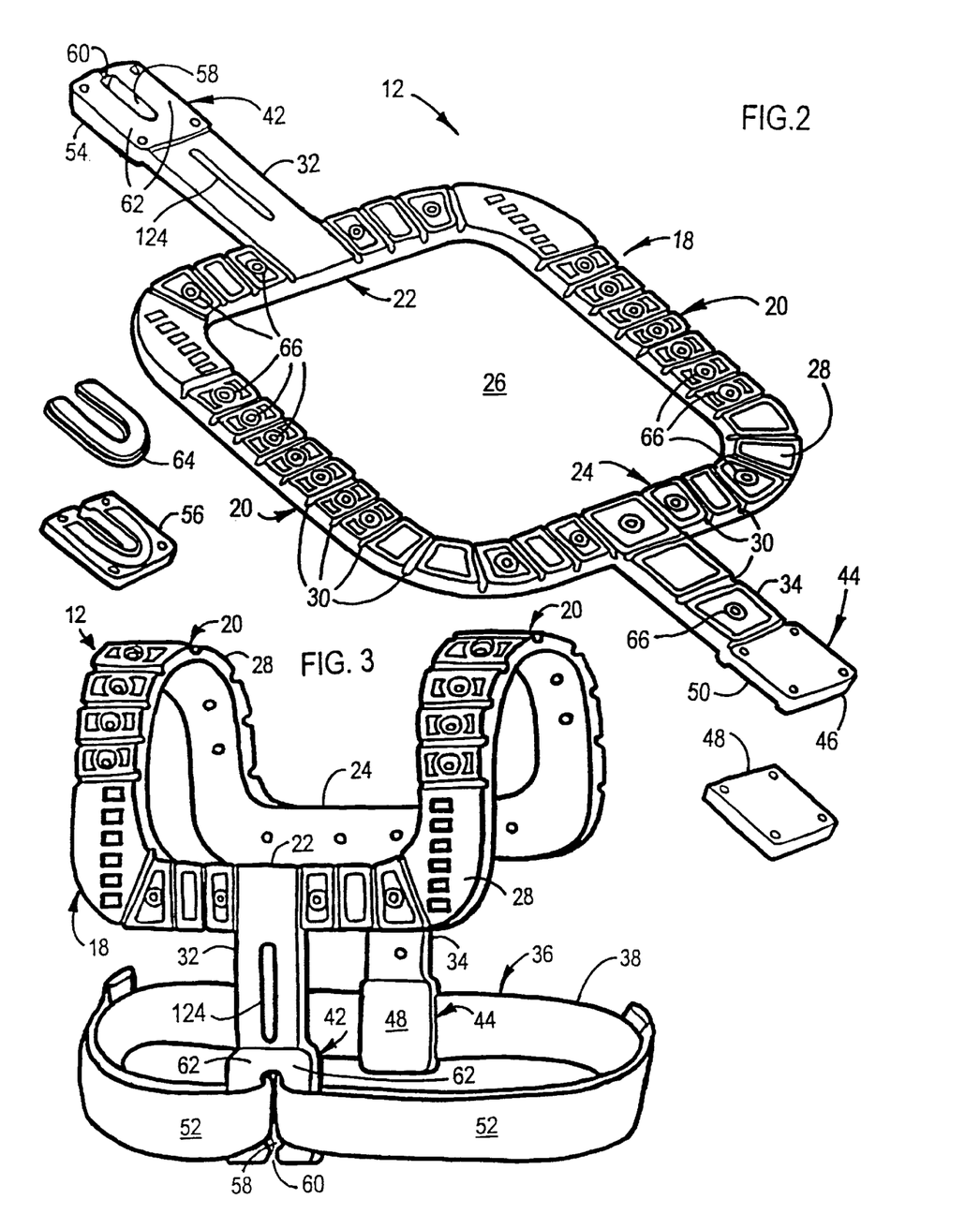
FIG. 2 is an exploded view of the harness of the apparatus shown in FIG. 1.
FIG. 3 is an isometric view of the assembled harness of FIG. 2 with a hook and loop closure mechanism securing the harness in an operative position.

As seen in FIG. 2, harness 12 includes an annular portion 18 that is conformable to the contours of a user's shoulders and upper torso. Annular portion 18 includes a pair of laterally spaced shoulder regions 20 that are joined by a pair of spaced-apart transverse regions 22, 24 to collectively define an enlarged central passage 26 for receiving a user's head when the apparatus is worn by a user. Transverse regions 22, 24 are configured to be adjacent a user's chest and back, respectively, when the apparatus is worn by a user.

As shown in FIGS. 2 and 3, harness 12 has an outer surface 28 that includes a multiplicity of periodically spaced channels 30 that enable the harness to flex and curvingly conform to a user's over-the-shoulder posture, and more specifically to the shape of the user's shoulders and upper torso. Channels 30 are spaced-apart along the annular portion and extend transverse to the annular portion. Because the harness can flex both toward and away from the user in essentially all directions, it is not only usable by users of all shapes and sizes, but also provides a comfortable and secure fit to the contours of the user's body. It should be understood that the periodically spaced channels may be spaced around the annular portion in even or uneven intervals. The channels are spaced-apart around at least a portion, and preferably a substantial portion, of the annular portion. Furthermore, while the channels may simply be slits in the outer surface of the annular surface, it is preferred that the channels have generally V- or U-shaped cross-sections to enable the harness to flex both toward and away from a user who is wearing the apparatus.

As shown in FIGS. 2 and 3, forward and rearward transverse regions 22, 24 include forward and rearward downwardly descending portions 32, 34, which extend generally perpendicularly away from the corresponding transverse region. The downwardly descending portions are detachably and adjustably coupled by a fastener 36 that engages both portions and selectively draws the portions toward each other as the fastener is cinched around a user's abdomen, thereby securing the apparatus on a user's shoulders and upper torso when the apparatus is worn by the user.

As shown in FIGS. 1 and 3, the fastener includes a strap 38, which is preferably formed of a flexible, yet durable material, such as nylon. The terminal region of each downwardly descending portion 32, 34 includes a clip 42, 44 for receiving at least a portion of the strap. The rearward clip 44 includes a pair of generally rectangular plates 46, 48 that are coupled together by screws, rivets or another suitable form of mechanical attachment (not shown). As shown, plate 46 is integrally formed with rearward downward descending portion 34, while plate 48 is formed independent of portion 34. The plates are configured to define a narrow track 50 between the plates through which at least a portion of the strap may pass. The strap may be adjustably mounted within the clip to enable the strap to be quickly removed and replaced. This is preferable when different sized users need to use the apparatus and require straps with different lengths. Alternatively, a central portion of the strap is secured in a fixed position by the clip and has end portions 52 which extend on opposed sides of the clip, as shown in FIG. 3. This configuration prevents the strap from being unintentionally removed from the apparatus and lost or misplaced.

The forward clip 42 is formed from a pair of slotted plates 54, 56, which are coupled together and define an elongate slot 58 with an opening 60 distal the annular portion. As shown, plate 54 is integrally formed with forward downwardly descending portion 32, while plate 56 is formed independent of portion 32. The plates collectively define a pair of spaced-apart prongs 62 extending on opposed sides of the slot. As shown in FIG. 2, clip 42 may further include an armature 64 between the plates to reinforce and add strength to the prongs. Armature 64 is formed of a suitable structural material, such as aluminum or steel.

Slot 58 is sized to be at least as long as strap 38 is wide so that each end portion 52 of the strap may be selectively inserted through the slot, around a respective one of the prongs, and then fastened back upon itself by a hook and loop closure mechanism, which is indicated generally at 53 in FIG. 1. A hook and loop closure mechanism is preferred because it provides for repeated fastening and unfastening of the end portions to securely cinch the strap around a variety of different sizes of users, although it should be understood that other suitable forms of closure mechanisms are also intended to be within the scope of the invention.

When a user is wearing the harness, the end portions of the strap are passed through the slot in the forward clip, and then drawn away from the clip to cinch the strap around the user's abdomen, and thereby conform the harness to the contours of the user's shoulders and upper torso. After being secured in a selected position by the hook and loop closure mechanism, either end portion of the strap may be quickly removed from the clip though the opening between the prongs. Opening 60 is relatively narrow so that the end portions of the strap may not be unintentionally removed from the clip. As shown in FIG. 3, the plates each include a pair of teeth 61 that extend toward each other adjacent the bottom of slot 58 to define the opening. This relatively narrow size of the opening requires the tension in a selected end portion to be lessened before that portion may be removed from the clip through the opening. Examples of ways of reducing the tension in the end portion include pulling the end portion toward the opposite side of the clip or by the user breathing in deeply. Once the tension is reduced, the end portion may be passed over the corresponding teeth and thereby removed from the slip without unfastening the closure mechanism that fastens the end portion of the strap against itself. This method of removing the strap enables the user to quickly unfasten the strap and remove the apparatus. Additionally, because the end portions remain fastened against themselves, even after they are removed through the opening, the apparatus can also be quickly remounted upon the user or a user with a similarly sized upper torso by reinserting the looped end portion through the opening and around the corresponding prong.

The downwardly descending portions may include at least one channel, as shown in FIG. 2, to add to the apparatus' ability to conform to the shape of any user's upper torso. In addition, it should be understood that the annular portion and downwardly descending portions are preferably constructed of a polypropylene and may be integrally formed or molded into a single semi-rigid unit, with the exception of plates 44 and 48 and armature 64.

Harness 12, and especially annular portion 18, further includes a multiplicity of periodically spaced sockets 66 for mounting objects on the harness. As shown in FIGS. 2–3, sockets 66 are spaced-apart around the shoulder regions and transverse regions, and are generally located between adjacent channels. By referring briefly back to FIG. 2, it can be seen that each shoulder region 20 includes a plurality of spaced-apart sockets 66 that are each aligned with a corresponding socket 66 on the other shoulder region. The aligned pairs of sockets collectively define a range of mounting positions on which platform 14 may be selectively and adjustably mounted.

It should be understood that the sockets may be evenly or unevenly spaced from each other and are not necessarily located between every pair of adjacent channels. Furthermore, the downwardly descending portions may also include at least one socket, although only a single socket is shown on the rearward downwardly descending portion. The sockets are threaded for receiving a screw and may vary in diameter for receiving screws with different diameters. A screw may be received through one of the sockets in the orientation shown in FIG. 7 so that its shaft extends though the socket toward, and ultimately into, the subsequently described tubular member 86. Alternatively, the screws may be secured to the tubular members and passed through the sockets, and the sockets may include recesses in the lower surface of the harness for receiving a nut or other screw-receiving device. In this method of mounting the tubular members to the harness, a screw with threaded ends is first secured to one of the tubular members, and then received through one of the sockets, where its other end is engaged by the nut or other screw-receiving device. Regardless, sockets are preferably configured so that a screw or other object received within the socket does not protrude beyond the lower surface of the harness where it could be uncomfortable when the apparatus is worn by a user.

Figures 4, 5, 6:
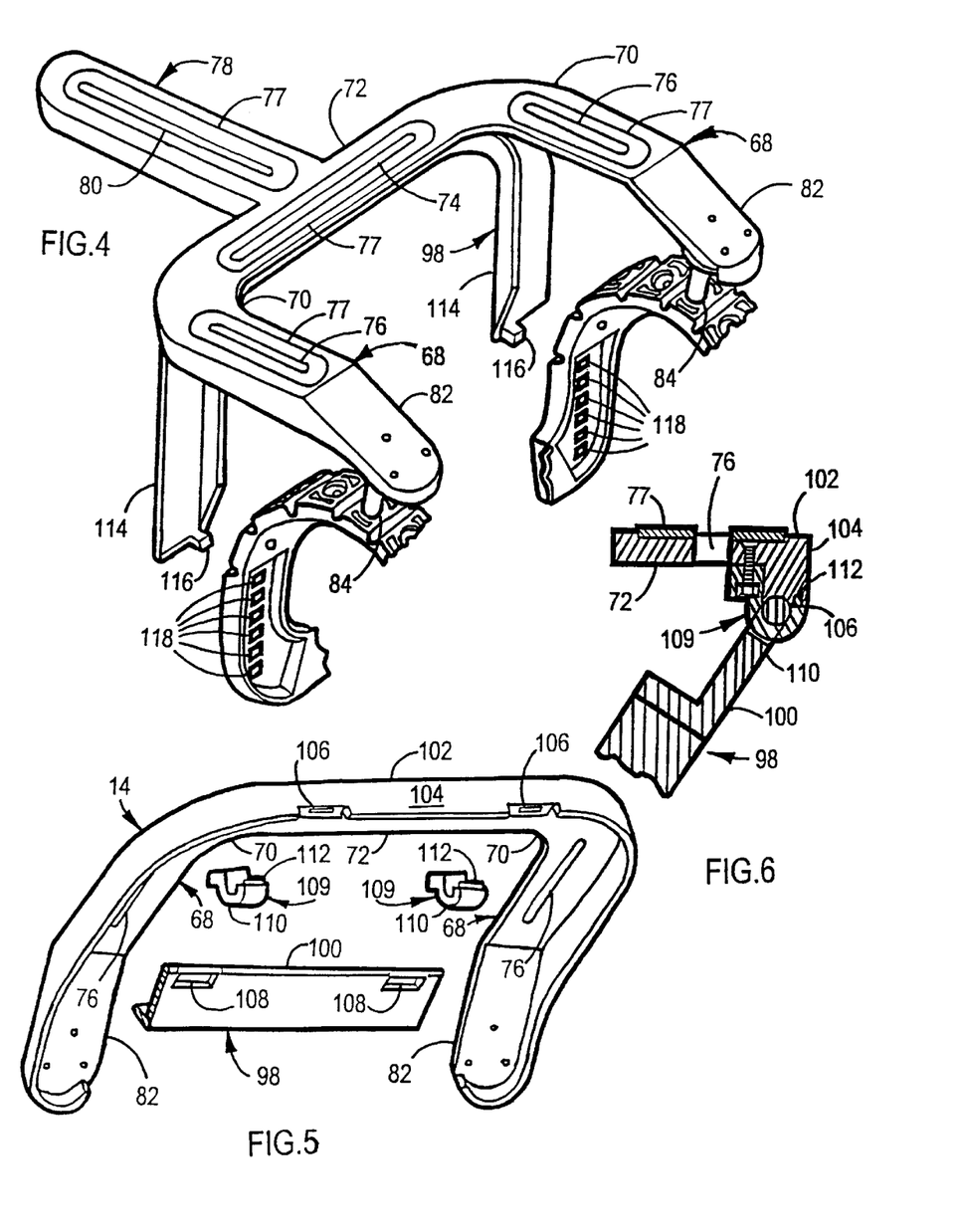
FIG. 4 is a fragmentary, rear isometric view of the apparatus of FIG. 1, but with an alternate embodiment of the platform.
FIG. 5 is a fragmentary exploded view of the platform and bracket shown in FIG. 1.
FIG. 6 is an enlarged cross-sectional detail of the interconnection between the support bracket and the front edge of the platform, as shown in FIG. 5.

Turning now to FIG. 5, it can be seen that platform 14 has a generally C-shaped configuration, with a pair of spaced-apart lateral regions 68 with forward portions 70 that are joined by a cross piece 72. The cross piece may be alternately thought of as a the platform's distal portion because it is positioned away from the shoulder regions. The cross piece includes at least one aperture 74 for removably and adjustably mounting a photography device, as shown in FIG. 4. Each lateral region 68 also includes at least one aperture 76 for removably and adjustably mounting a photography device. As shown in FIG. 4, the apertures are elongate slots extending in the direction of the region or piece on which it is located. Furthermore, each slot is encircled by a layer of padding material 77 that is adhered to the platform to protect the platform and any mounted photography device from scratching or otherwise damaging each other.

Platform 14 may also include an elongate tongue 78 which extends away from cross piece 72 in a direction generally parallel to the lateral and shoulder regions, as shown in FIG. 4. Tongue 78 includes at least one aperture 80 for removably and adjustably mounting a photography device. As shown, the aperture is an elongate slot extending generally parallel to the lateral and shoulder regions, and tongue 78 is integrally formed with the rest of platform 14. The tongue may, however, be formed separate from the platform and thereafter attached to the platform by any suitable means of removable or permanent attachment.

It should be understood that the previously described apertures for removably and adjustably mounting a photography device are meant to include all forms of single and plural holes, slots, sockets or any combination thereof that enable a photography device to be selectively mounted on the platform. Furthermore, the apertures should enable the device to be adjustably mounted within a range of positions. For example, as shown in FIG. 4, the apertures on platform 14 are elongate slots that enable a photography device to be mounted along the range of positions defined by the length of the slot. Furthermore, the previously described photography devices are meant to include all cameras, such as photographic, video, broadcast, digital imaging and box, as well as all mountable accessories therefor, such as lighting units, flashes, and lap-top computers. In addition, viewing devices such as binoculars or telescopes may be mounted on the platform in a similar fashion as the previously described photography devices.

Figure 8A:
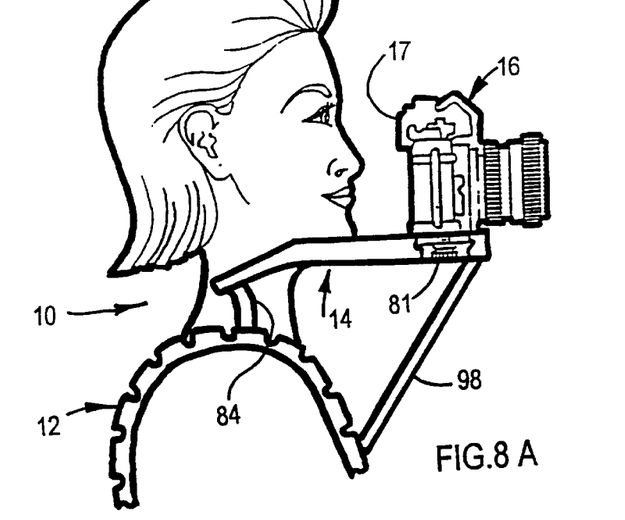
FIG. 8A is a simplified side view showing a user wearing the apparatus of FIG. 1 with a camera mounted on the platform and a portion of the platform broken away to show the mechanism by which the camera is mounted on the platform.
Figure 9:
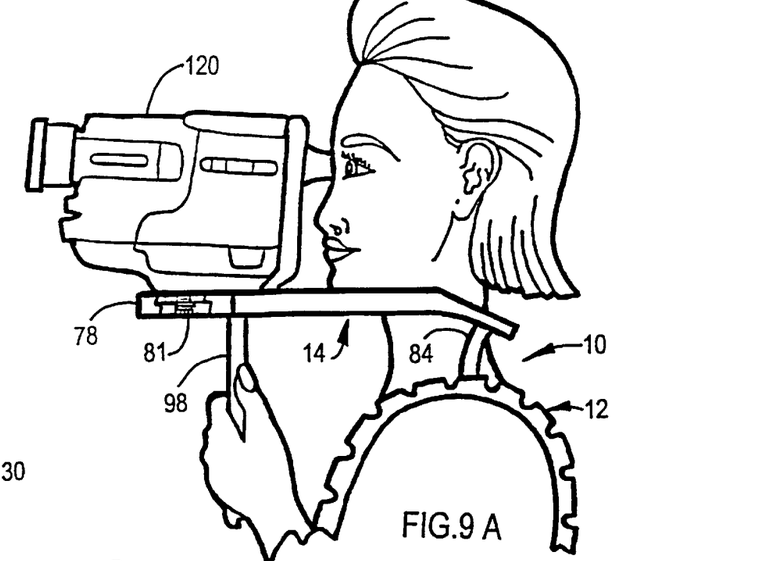
FIG. 9A is a simplified side view showing a user wearing the apparatus of FIG. 4 with a video camera mounted on the platform and a portion of the platform broken away to show the mechanism by which the video camera is mounted on the platform.
FIG. 9B is a fragmentary side view similar to the view shown in FIG. 9A, but showing the user using the support bracket to raise the platform and the camera to an upwardly oriented position.

A particular photography device is mounted on the platform on any slot which provides the spacing required to maintain the eyepiece of the device at an operative position with respect to a user's eyes. Because the slots provide for adjustable mounting, a device may be slid along the length of the slot in order to position the device in the most desirable mounting position on the platform. The devices are secured in a given position with respect to the slot by a threaded screw 81, which is inserted from the lower side of the platform, through the slot and into the photography device, as shown in FIGS. 8A and 9A.

Figure 8B:
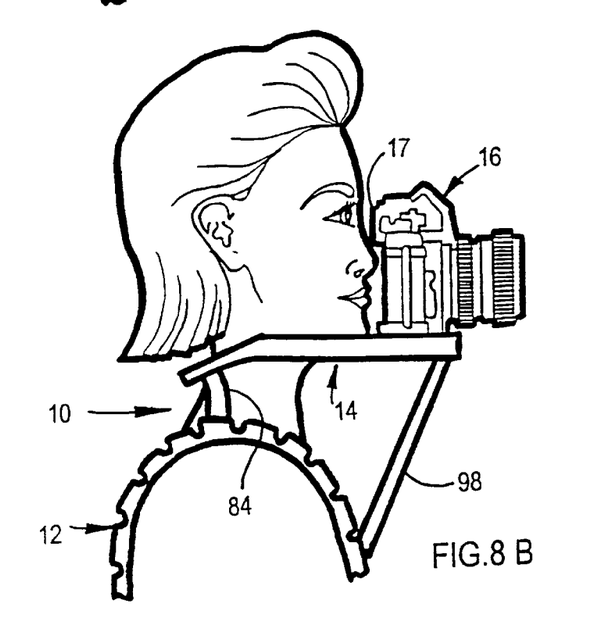
FIG. 8B is a simplified side view similar to the view shown in FIG. 8A, but with the platform mounted on the harness in a more rearward position, thereby bringing the camera closer to the user's eyes.

As discussed above, the relative position of the photography device on the platform is adjusted by selectively mounting the device along the length of any of the slots on the platform. To mount the device in the most suitable position for a particular user, it may also be necessary to adjust the position of the platform with respect to the harness. For example, in FIG. 8A, camera 16 is mounted on the elongate slot in cross piece 72. As shown, the camera's eyepiece 17 is too far in front of the user's eyes for the camera to be used. While it may be possible for the user shown in FIG. 8A to strain her neck to operably position her eyes with respect to the eyepiece, it would be very uncomfortable, and would also render it difficult for the user to maintain the platform steady in a particular orientation. By adjusting the platform to a more rearward position with respect to the harness, however, the eyepiece can be positioned in an optimal, comfortable position with respect to the user's eyes, as shown in FIG. 8B.

Figure 7:
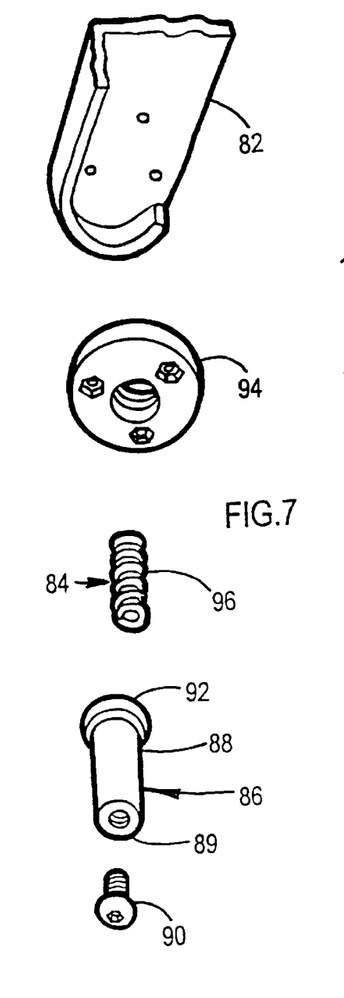
FIG. 7 is an exploded, fragmentary view of the rearward portion of the platform and one of the fastening mechanisms used to mount the platform on the shoulder region of the harness shown in FIG. 2.

Specifically, the platform's lateral regions each further includes a rearward portion 82, which extends downwardly at an angle from the corresponding forward portion and is pivotally and adjustably mounted on a socket on a respective one of the shoulder regions, as shown in FIGS. 4 and 5. The platform, and more specifically, rearward portions 82 are pivotally and adjustably mounted on one of the harness' aligned pairs of sockets 66 by a pair of flexible fastening members 84, as shown in FIGS. 4 and 7. Fastening members 84 are removably coupled to a pair of aligned sockets on the shoulder regions and pivotally mount the platform on the harness within the range of positions defined by the pairs of aligned sockets on the shoulder regions.

Each fastening member 84 includes a flexible, tubular member 86, which is preferably formed of a resilient material such as rubber, and includes a hollow, generally conical body portion 88 with a lower region 89 that is threaded and configured to be inserted into one of the sockets on the harness and to be removably secured thereon by a screw 90. The tubular members each further includes an upper portion 92 with a cross-section that is larger than that of the lower surface and which is captured and retained by a mounting plate 94 that is attached to the lower surface of a respective one of the harness' rearward portions. Each tubular member 86 receives a spring 96 that increases the resilience of the member and biases the member to return to its original, unstressed position when it is bent or otherwise deformed. Besides enabling the platform to be pivoted upwardly and downwardly from a fulcrum on the harness' shoulder regions, the flexible members also enable slight lateral or rotational pivoting of the platform even when the user's body remains motionless. Furthermore, the members absorb vibrations and other external forces which may cause the photography device to vibrate or otherwise move in an unintended or unwanted direction.

The pivotally mounted harness is maintained in a selected angular orientation with respect to the harness by a support bracket 98 that is pivotally mounted on the distal portion of the platform and is adjustably and removably coupled to the forward portion of the harness. The bracket not only stabilizes the platform, but also enables the resting angular orientation of the platform (and photography device) to be adjusted with respect to the harness without requiring the user to bend forward or backward. Specifically, the bracket selectively orients the platform within a range of defined angular positions with respect to the platform. This is particularly useful when the apparatus is to be used to photograph or film objects that are at an angle above or below the user.

As shown in FIGS. 5 and 6, bracket 98 includes a first end 100 that is pivotally coupled to the forward edge portion 102 of the platform's cross piece 72. End 100 has a generally planar cross-sectional profile as it extends from forward edge portion 102 of the platform, as shown in FIG. 6. In FIG. 5, end 100 is shown with its lateral ends partially broken away, but it should be understood that it has the same shape and configuration as shown in FIG. 6. The platform includes an outer, downwardly descending edge 104, which includes forward edge portion 102 adjacent cross piece 72. The forward edge portion includes a pair of grooves 106, and the bracket's first end 100 includes a corresponding pair of slots 108. A pair of latches 109 are mounted to the lower surface of cross piece 72 and each includes a hook-like member 110 which extends through a respective one of the tabs on the first end of the bracket. Hook-like members 110 further include a narrow tab 112 which is inserted into the corresponding groove on the forward edge portion. Once coupled together by the clasps in a hinged, pivotal configuration, the bracket pivots about the front edge of the platform about an axis generally parallel to the front edge of the platform.

Bracket 98 further includes a second end 114 with a pair of spaced-apart tabs 116, as shown in FIG. 4. Each tab is configured to be selectively received into a respective one of a pair of laterally spaced series of slots 118 in the harness adjacent the forward transverse member. By varying which slots the tabs are receiving into, the angle of the platform, as well as any photography device mounted thereon, is adjusted with respect to the harness.

Instead of inserting the bracket's second end into a pair of slots on the forward portion of the harness, the bracket may be grasped by a user and used to pivot the platform and any attached photography device upwardly and downwardly with respect to the harness' shoulder regions. As shown in FIG. 9A, a video camera 120 is mounted on the elongate slot on tongue 78. The camera is secured upon the platform by a screw 81, which is inserted from the underside of the tongue, through the slot and into the video camera. As shown, the platform and camera are maintained at a generally horizontal level with respect to the harness, but the user is holding the support bracket instead of inserting the bracket into the slots on the forward portion of the harness. This enables the user to adjust the upward and downward angle of the platform and camera by raising or lowering the bracket, as shown in FIG. 9B. The pivotal connection between the bracket and the platform provides for a relatively smooth tilting movement as the bracket is raised or lowered. Furthermore, because the bracket pivots about the distal edge of the platform, the bracket is positioned in a convenient, easily accessible location for the user to grasp and manually adjust.

To briefly summarize, the previously described invention is a wearable, apparatus that essentially turns a user's body into a tripod. The apparatus includes a semi-rigid, unitary harness that is conformable to the contours of a user's shoulder and upper torso and is securable thereon. A platform is pivotally and adjustably mounted within a range of positions on the harness and is configured to adjustably receive at least one photography device and maintain the device in an operative position for use by the user. When the user's shoulders and upper torso are rotated left-to-right, the device is panned from left to right. Similarly, when the user bends forward or backward, the device is tilted upward and downward, respectively.

As discussed, the multiple apertures on the platform enable the apparatus to be used with most, if not all, photography devices. For example, the slot on the cross piece is most suitable for photography devices that are relatively thin, such as standard 35 millimeter cameras. In contrast, the slot on the tongue is better suited for more elongate photography devices, such as some non-standard photographic cameras and most home video cameras. The slots on the lateral regions of the platform may be used to mount accessories, such as lights, flashes, etc., or alternatively to mount commercial broadcast cameras and other larger video cameras. Other accessories, such as computers, power supplies and storage containers may be mounted on the sockets in the harness and, if necessary, coupled to an attached photography device.

Therefore, the apparatus enables all of a user's equipment to be mounted directly or indirectly on a body-conformable harness. The apparatus frees the user's hands and distributes the weight of the photography devices and accessories over the user's shoulders and upper torso. In addition, by essentially turning the user's body into a tripod, the apparatus allows the user to pan the photography device left or right and to tilt the device up or down simply by swiveling or bending the user's body. This is particularly advantageous in situations where it would be impractical or impossible to use a free-standing tripod.

When the platform is not being used, the second end of the support bracket may be pivoted upwardly to a position where the bracket and the platform are in a generally parallel, nested configuration. Once stored against each other, the platform and bracket may be pivoted downwardly from the fastening members to lie adjacent the forward surface of the harness. Alternatively, the platform and bracket may be removed from the harness by unfastening the fastening members from the sockets on the harness.

Figure 10:
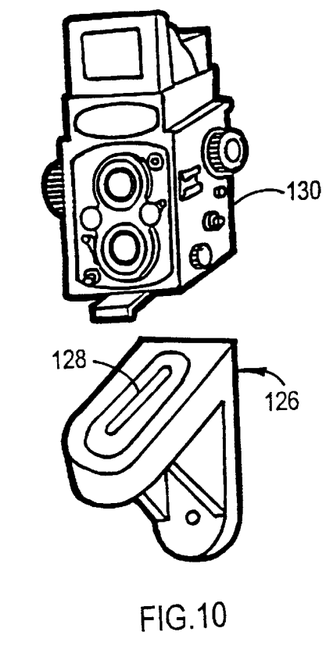
FIG. 10 is an exploded view showing a shelf which may be mounted on the harness' forward downwardly descending portion for securing a photography device such as a digital camera or a box camera, as shown in the figure.

Once the platform and support bracket are removed, the harness may still be used to mount and transport objects that are secured to the harness' sockets. For example, storage containers, such as nylon or mesh bags, could be configured to be mounted on the harness using the previously described sockets. Additionally, the forward downwardly descending portion 32 includes an elongate slot 124 that extends generally parallel to the shoulder regions, as shown in FIGS. 2–3. A shelf 126, shown in FIG. 10, may be adjustably and removably mounted on the slot. Shelf 126 includes at least one aperture 128 for adjustably and removably mounting a photography device, such as box camera 130, which is shown in FIG. 10 or a digital imaging camera. As shown, the aperture is an elongate slot that extends outwardly from the downwardly descending portion.

Accordingly, while the preferred embodiments of the present invention have been shown and described, it will be apparent to those skilled in the art that other changes in form and detail may be made therein without departing from the spirit and scope of the invention as defined in the appended claims.

We claim:

1. A body-conformable apparatus, comprising:
    a flexible, resilient harness including a one-piece annular portion conformable to the contours of a user's shoulders and upper torso and selectively securable thereon, the portion having a pair of laterally spaced shoulder regions joined by a pair of spaced-apart transverse regions that collectively define an enlarged central passage for receiving a user's head when the harness is worn by a user; and
    a platform directly mounted on the shoulder regions of the annular portion, wherein the platform is configured to removably receive a photography device and maintain the device in an operative position for use by the user.

2. The apparatus of claim 1, wherein the transverse regions each includes a downwardly descending portion, and wherein the apparatus further includes a fastener adjustably coupled between the downwardly descending portions and configured to draw the downwardly descending portions against a user's abdomen, thereby securing the apparatus on the user's shoulders and upper torso.

3. The apparatus of claim 1, wherein the harness has an outer surface that includes a multiplicity of periodically spaced channels that enable the harness to flex and curvingly conform to the shape of a user's shoulders and upper torso.

4. A body-conformable apparatus, comprising:
    a flexible, resilient harness including a one-piece annular portion conformable to the contours of a user's shoulders and upper torso and selectively securable thereon the portion having a pair of laterally spaced shoulder regions joined by a pair of spaced-apart transverse regions that collectively define an enlarged central passage for receiving a user's head when the harness is worn by a user; and
    a platform mounted on the harness, wherein the platform is configured to removably receive a photography device and maintain the device in an operative position for use by the user, wherein the platform is pivotally and adjustably mounted on the shoulder regions and extends generally forward from the shoulder regions, and further wherein the platform includes a distal portion away from the shoulder regions that includes at least one aperture for mounting a photography device.

5. The apparatus of claim 4, wherein the platform includes an elongate tongue extending away from the distal portion of the platform, the tongue having at least one aperture for mounting a photography device.

6. A body-conformable apparatus, comprising:
    a flexible, resilient harness including a one-piece annular portion conformable to the contours of a user's shoulders and upper torso and selectively securable thereon, the portion having a pair of laterally spaced shoulder regions joined by a pair of spaced-apart transverse regions that collectively define an enlarged central passage for receiving a user's head when the harness is worn by a user; and
    a platform mounted on the harness, wherein the platform is configured to removably receive a photography device and maintain the device in an operative position for use by the user, and further wherein the platform includes a pair of spaced-apart lateral regions, each lateral region including at least one aperture for mounting a photography device.

7. A body-conformable apparatus, comprising:
    a flexible, resilient harness including a one-piece annular portion conformable to the contours of a user's shoulders and upper torso and selectively securable thereon, the portion having a pair of laterally spaced shoulder regions joined by a pair of spaced-apart transverse regions that collectively define an enlarged central passage for receiving a user's head when the harness is worn by a user; and a platform mounted on the harness, wherein the platform is configured to removably receive a photography device and maintain the device in an operative position for use by the user, and further wherein each shoulder region includes a plurality of longitudinally spaced-apart sockets that enable the platform to be selectively mounted along a range of defined positions with respect to the shoulder regions, and wherein the sockets on a first one of the shoulder regions are aligned with corresponding sockets on the other shoulder region.

8. The apparatus of claim 7, wherein the platform includes a pair of flexible fastening members extending in a direction generally normal to the platform and configured to be coupled to a pair of the aligned sockets to pivotally and adjustably mount the platform on the harness.

9. The apparatus of claim 7, wherein the platform includes a pair of spaced-apart lateral members extending generally parallel to the shoulder regions, wherein each lateral member includes a forward portion and rearward portion that extends downwardly at an angle from the forward portion and is pivotally and adjustably mounted on one of the sockets on a respective one of the shoulder regions.

10. A body-conformable apparatus, comprising:

a flexible, resilient harness including a one-piece annular portion conformable to the contours of a user's shoulders and upper torso and selectively securable thereon, the portion having a pair of laterally spaced shoulder regions joined by a pair of spaced-apart transverse regions that collectively define an enlarged central passage for receiving a user's head when the harness is worn by a user; and a platform directly mounted on the shoulder regions of the harness, wherein the platform is configured to removably receive a photography device and maintain the device in an operative position for use by the user, and further wherein the platform includes a forward edge portion and a support bracket, the support bracket having a first end that is pivotally coupled to the edge portion of the platform and a second end that is configured to be selectively and adjustably coupled to the harness to support the platform in a defined orientation relative to the harness.

11. The apparatus of claim 10, wherein the harness includes a forward region having two laterally spaced series of slots, and wherein the second end of the support bracket includes a pair of spaced-apart tabs, each tab configured to be selectively received into a respective one of the slots to support the platform in a defined orientation relative to the harness.

12. The apparatus of claim 10, wherein the second end of the bracket is configured to be pivoted upwardly to a position where the bracket and platform are in a generally parallel, nested configuration for storage of the bracket adjacent the platform.

13. A body-conformable apparatus, comprising:

a flexible, resilient harness including a one-piece annular portion conformable to the contours of a user's shoulders and upper torso and selectively securable thereon, the portion having a pair of laterally spaced shoulder regions joined by a pair of spaced-apart transverse regions that collectively define an enlarged central passage for receiving a user's head when the harness is worn by a user, wherein the harness has a forward portion that includes an adjustable and selectively removable shelf for receiving a photography device, the shelf extending away from the harness and having at least one aperture for mounting a photography device; and a platform mounted on the harness, wherein the platform is configured to removably receive a photography device and maintain the device in an operative position for use by the user.

14. A body-comfortable apparatus, comprising:

a platform for removably receiving a photography device;

a flexible harness securable upon a user's upper torso having forward, upper and rearward regions, the harness having a pair of laterally spaced shoulder regions having portions extending over the forward, upper and rearward regions of the user's upper torso, each shoulder region including a plurality of spaced-apart sockets that are each aligned with a corresponding socket on the other shoulder region, wherein the plurality of sockets extend at least along the portions of the shoulder regions extending over the forward and upper regions of the user's upper torso, wherein the platform is fully supported and pivotally and adjustably mounted on a pair of the sockets, and wherein the pairs of aligned sockets enable the platform to be selectively mounted in a range of positions with respect to the harness.

15. The apparatus of claim 14, wherein the harness has an outer surface that includes a multiplicity of periodically spaced channels that enable the harness to flex and curvingly conform to the shape of a user's shoulders and upper torso.

16. The apparatus of claim 14, wherein the platform includes a pair of flexible fastening members extending in a direction generally normal to the platform and configured to be coupled to a pair of the aligned sockets to pivotally and adjustably mount the platform on the harness.

17. The apparatus of claim 14, wherein the platform includes a forward edge portion and a support bracket, the support bracket having a first end that is pivotally coupled to the edge portion of the platform and a second end that is configured to be selectively and adjustably coupled to the harness to support the platform in a defined orientation relative to the harness.

18. A body-comfortable apparatus, comprising:

a platform for removably receiving a photography device:

a flexible harness securable upon a user's upper torso, the harness having a pair of laterally spaced shoulder regions, each region including a plurality of spaced-apart sockets that are each aligned with a corresponding socket on the other shoulder region, wherein the platform is pivotally and adjustably mounted on a pair of the mounting sockets, and wherein the pairs of aligned sockets enable the platform to be selectively mounted in a range of positions with respect to the harness, wherein the harness includes a pair of spaced-apart transverse regions extending between the shoulder regions, wherein each transverse region includes a downwardly descending portion, and further wherein the apparatus further includes a fastener adjustably coupled between the downwardly descending portions and configured to draw the downwardly descending portions against a user's abdomen, thereby securing the apparatus on the user's shoulders and upper torso.

19. A body-conformable apparatus, comprising:

a platform for removably receiving a photography device;

a unitary, semi-rigid harness conformable to the over-the-shoulders posture of a user, the harness having a pair of laterally spaced shoulder regions that define a passage therebetween for receiving a user's head when the harness is worn by a user, each shoulder region having a plurality of longitudinally spaced sockets that are aligned with corresponding sockets on the other shoulder region, wherein the platform is adjustably and detachably mounted on a pair of the aligned sockets on the shoulder regions and extending generally forward therefrom, the plurality of aligned sockets enabling the platform to be selectively mounted in a range of positions with respect to the harness;

a pair of generally horizontal transverse members extending between the shoulder regions, each transverse member configured to be adjacent a user's chest or back, respectively, when the apparatus is worn by a user, and each transverse member including a downwardly descending portion; and a body-encircling fastening member coupled to the downwardly descending portions of the harness and configured to be cinched around a user's abdomen to secure the harness on a user's shoulders.

\* \* \* \* \*